United States Patent [19]

Menon

[11] Patent Number: 4,498,550
[45] Date of Patent: Feb. 12, 1985

[54] WEIGHT MEASURING APPARATUS WITH CORRUGATED SPRING ELEMENTS

[75] Inventor: Narendranath Menon, Arlington, Tex.

[73] Assignee: General Electrodynamics Corp., Arlington, Tex.

[21] Appl. No.: 497,149

[22] Filed: May 23, 1983

[51] Int. Cl.³ ............................................. G01G 5/04
[52] U.S. Cl. ..................................... 177/209; 177/254
[58] Field of Search ................................ 177/209, 254

[56] References Cited

U.S. PATENT DOCUMENTS

| | | |
|---|---|---|
| 2,051,042 | 8/1936 | Hendel et al. .................. 177/209 X |
| 2,107,883 | 2/1938 | Benedek . |
| 2,314,011 | 3/1943 | Maurer . |
| 2,886,301 | 5/1959 | Aske . |
| 2,932,501 | 4/1960 | Hicks . |
| 3,191,701 | 6/1965 | Gray . |
| 3,217,818 | 11/1965 | Engelsher et al. .............. 177/209 X |
| 3,464,509 | 9/1969 | Gray . |
| 4,007,800 | 2/1977 | Janach et al. . |

FOREIGN PATENT DOCUMENTS 59173 8/1968 German Democratic Rep. .

OTHER PUBLICATIONS

*Load O Meter Corporation* brochure on Portable Weighing Devices, "Haenni Scale for Wheel-Loads".

Primary Examiner—George H. Miller, Jr.
Attorney, Agent, or Firm—Jerry W. Mills; Gregory M. Howison; Nina Medlock

[57] ABSTRACT

A weighing scale (10) includes a base (12) with a connecting channel (14) disclosed therein. A layer (16) of elastically deformable material is disposed over this channel with longitudinal corrugations (18) disposed therein. Each of these corrugations (18) is formed integral to the layer (16) and has a wall thickness essentially equal thereto. The interior portion of each of the corrugations (18) and the surface of the base (12) form a plurality of deformable volumes (20). The deformable volumes (20) and the connecting channel (14) comprise a common reservoir that is connected to an expanding bellows-type gauge (30). The expanding bellows gauge (30) allows for volumetric displacement of fluid within the deformable volumes (20). A load bearing layer (28) is disposed adjacent the apexes of the corrugations (18) exterior to the deformable volumes (20). Weight applied to the load bearing layer (28) results in deformation of the corrugations (18) and a volumetric displacement of fluid from the deformable volumes (20) to the expanding bellows-type gauge (30). Measurement of this volumetric displacement is converted into a weight measurement that can be directly read from the face of the gauge (30).

21 Claims, 6 Drawing Figures

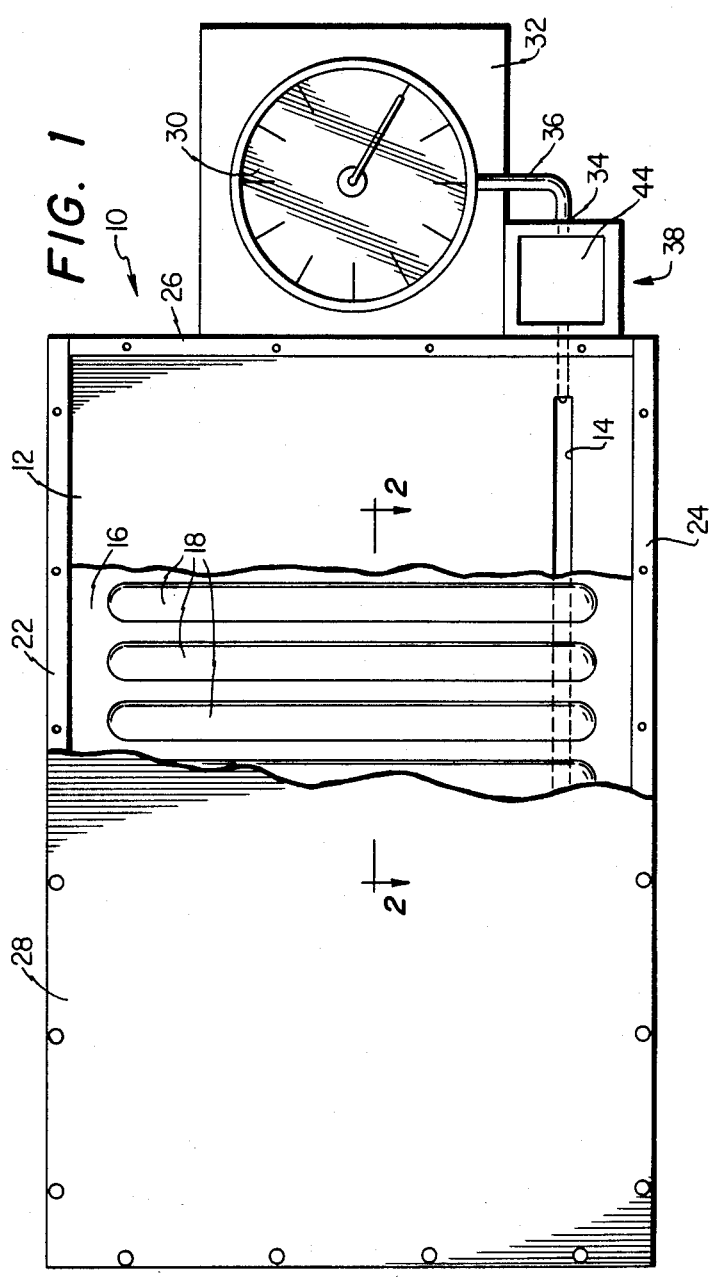
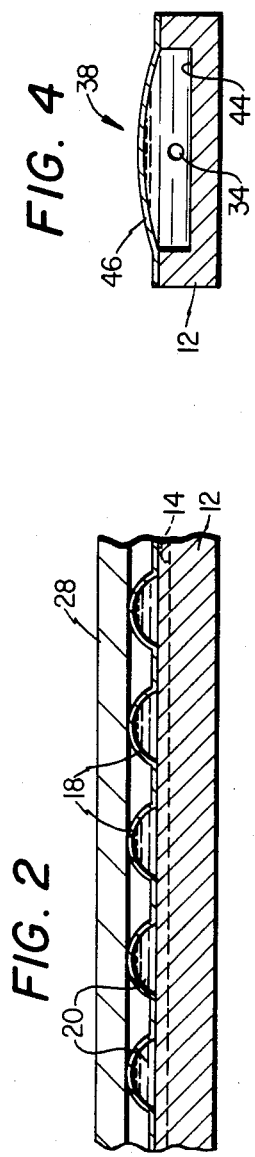
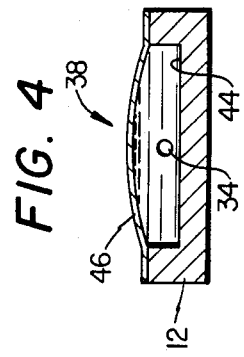

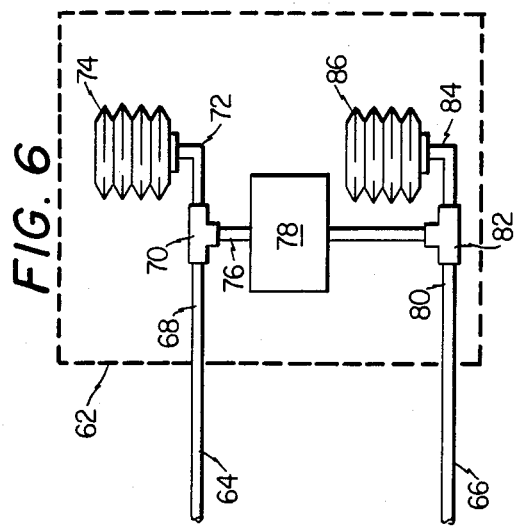
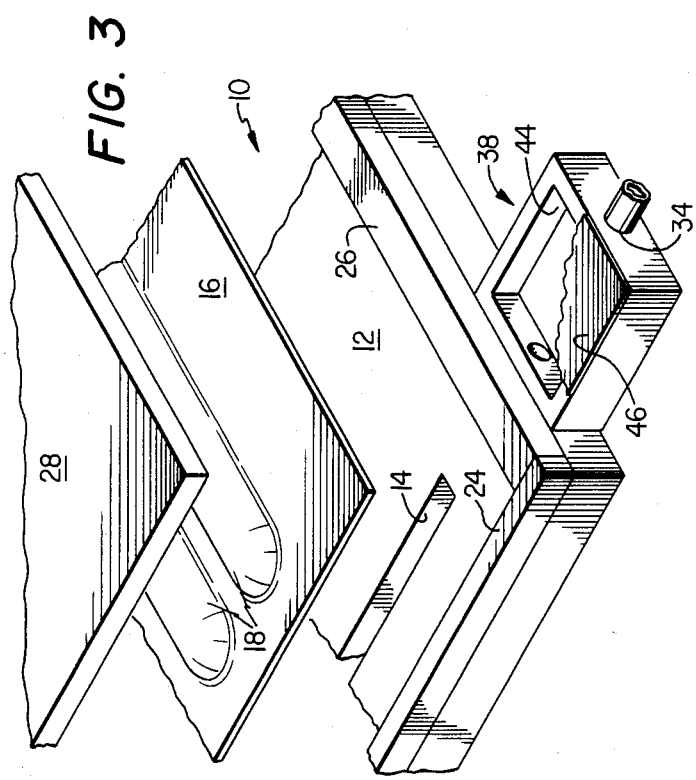
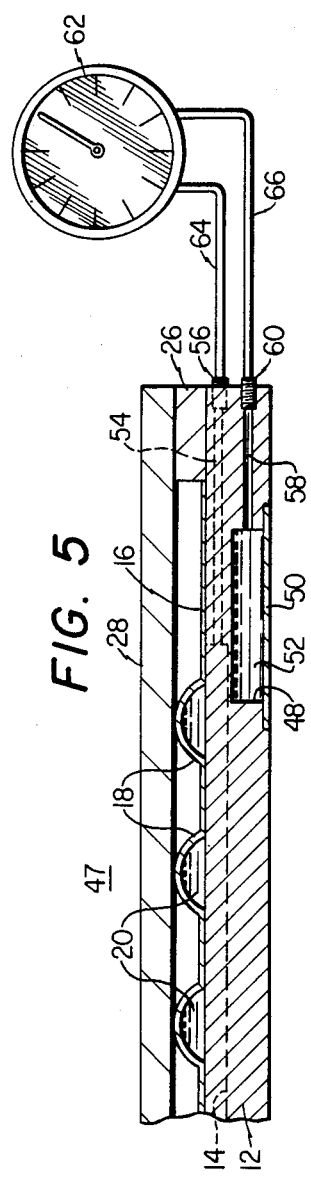

WEIGHT MEASURING APPARATUS WITH CORRUGATED SPRING ELEMENTS

TECHNICAL FIELD

The present invention pertains in general to weight scales and, more particularly, to portable scales for measuring relatively large loads.

BACKGROUND OF THE INVENTION

Portable scales for use in measuring large loads such as heavy vehicles require that they be relatively lightweight with a small size and a low profile. These types of scales are especially useful by state agencies "in the field" to determine if commercial vehicles are operating within allowable load limits. To accomplish the weight measurement, a number of scales are normally placed on the roadway or the shoulder thereof and the vehicle driven thereon such that all of the vehicle's wheels are supported. The environment in which this weight measurement is performed requires reasonably stable temperature characteristics in the scales to provide a reasonably accurate measurement. Normally, prior art scales have provided some type of zeroing mechanism to compensate for temperature variations after the scales have stabilized at an ambient temperature. However, these mechanisms require that the scales be allowed to stabilize prior to performing the weight measurement. These types of scales are impractical in a normal working enviroment since the scaler may be removed from one temperature medium and suddenly placed in another temperature medium, such as a concrete road, for a very short time before making the weight measurement, resulting in substantial inaccuracies.

Previously developed portable scales have utilized some arrangement of springs or hydraulics to measure vehicle weight and still retain some level of portability. In the past, such apparatus has often been bulky in order to achieve the required degree of accuracy. One device that has provided a relatively small scale is disclosed in U.S. Pat. No. 4,007,800 issued to W. Janach, et al. This scale utilizes a plurality of parallel elliptically shaped hollow spring elements. The spring elements all communicate with a gauge and are filled with a fluid. A plate disposed on top of the spring elements compresses the spring elements when subjected to an external weight. The compression of these spring elements results in a volumetric displacement thereby forcing the fluid therein to be displaced into an external reservoir, which is comprised of an expanding bellows-type gauge. The deflection of the bellows is proportional to the deflection of a needle on the gauge. By measuring the volumetric change, the elastic deformation of the spring elements can be converted to a weight measurement.

Although the Janach patent discloses a low profile scale, the use of the elliptical spring elements presents manufacturing and cost problems. This is due to the fact that the elliptical spring elements are essentially tubular members that must be carefully dimensioned and attached to a base on the exterior thereof and then the interiors thereof must be attached to a common channel connecting them to the gauge. In addition, the temperature stability of such previously developed scales has not been completely satisfactory. There thus exists a need for a lightweight portable scale with improved accuracy and with temperature compensation that is relatively simple to manufacture.

SUMMARY OF THE INVENTION

The present invention described and claimed herein comprises an apparatus for measuring weight. The apparatus includes a base having a planar upper surface with a layer of elastically deformable material disposed thereon. The elastic layer has a plurality of concavities formed therein oriented to protrude outward from the base. The interior portion of the concavities and the planar surface of the base form a plurality of deformable chambers. A channel is disposed in the base for communicating with the interior of all of the deformable chambers to form a common reservoir which is filled with a fluid. An expansion bellows is connected to the channels to allow for volumetric displacement of the fluid in the deformable chambers. A load bearing layer is disposed on the concavities exterior to the deformable chambers for receiving the weight to be measured. The load bearing layer is operable to deform the deformable chambers such that the fluid disposed therein is displaced into the bellows. A gauge is provided for measuring the volumetric displacement of the fluid in the deformable chambers as a function of the deformation thereof resulting from weight applied to the load bearing layer.

In an alternate embodiment of the present invention, the concavities in the elastically deformable layer are comprised of a plurality of parallel longitudinal concave members having an arcuate cross section. The longitudinal members are spaced equidistant apart and form a plurality of longitudinal chambers when disposed adjacent the base, all of the longitudinal chambers having essentially equal volumes In yet another embodiment of the present invention, a compensating chamber is attached between the sealed chambers and the expansion bellows to compensate for expansion and contraction of the fluid over temperature. The compensating chamber expands for a corresponding expansion of the fluid as a function of temperature and contracts for a corresponding contraction of the fluid as a function of temperature. This expansion and contraction of the compensating chamber over temperature prevents expansion or contraction of the expansion bellows as a function of temperature.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a planar view of the scale of the present invention with portions thereof cut away to illustrate the various assemblies;

FIG. 2 illustrates a cross-sectional view taken along lines 2—2 of FIG. 1;

FIG. 3 illustrates an exploded view of the embodiment of FIG. 1;

FIG. 4 illustrates a sectional view of the temperature variable sealed volume;

FIG. 5 illustrates a cross-sectional view of another embodiment of the present invention utilizing a differential measuring system; and FIG. 6 illustrates the differential measuring apparatus of the embodiment of FIG. 5.

DETAILED DESCRIPTION OF THE INVENTION

Referring now to FIGS. 1-3, there are illustrated various views of a scale 10 with cutaway portions illustrating the assemblies therein. Scale 10 includes a rectangular base 12 having a planar upper surface. A connecting channel 14 is disposed in the surface of the base 12. A layer of elastic deformable material 16 is disposed over the planar surface of the base 12 and covering the channel 14.

The elastic layer 16 has a plurality of longitudinal corrugations 18 formed therein that are parallel to each other and oriented at essentially right angles to the channel 14. The longitudinal corrugations 18 protrude outward from the surface of the base 12 and have a cross-sectional shape with a concave inner surface, as best illustrated in FIG. 2. The layer 16 is bonded to the base 12 with an adhesive film such that the layer 16 adheres to and seals the surface of the base 12 around the perimeter of the corrugations 18. Since the corrugations are formed by indenting the layer 16, the thickness of the material for each of the corrugations 18 is essentially equal to the thickness of the layer 16. When the layer 16 is bonded to the base 12, the interior of each of the corrugations 18 bounded by the planar surface of the base 12 forms a plurality of deformable volumes 20.

The channel 14 is disposed in the base 12 such that it passes under each of the corrugations 18 to allow communication therebetween. This allows all of the deformable volumes 20 formed by the corrugations 18 and the channel 14 to communicate as a common reservoir.

Edge borders 22 and 24 are disposed along the edge of the base 12. An end border 26 and an end border (not shown) are attached to the edges on opposite ends of the base 12. In addition to securing the layer 16 to the base 12 at the edges thereof, the borders 22, 24 and 26 also function as spacers that have a height dimension measured from the surface of the layer 16 that is essentially equal to the height of the apex of the corrugations 18 therefrom. All of the corrugations 18 have an essentially equal height from the surface of the base 12, thereby resulting in essentially equal volumes in the deformable volumes 20.

A load bearing layer 28 is disposed on top of the corrugations 18 with the peripheral edges thereof resting on and secured to the borders 22, 24 and 26. The load bearing layer 28 is operable to distribute a weight applied thereto to the corrugations 18. The borders 22, 24 and 26 function as spacers to support the edges of the layer 28. Since the corrugations 18 are fabricated from an elastically deformable material, weight applied thereto causes a deformation thereof resulting in a displacement of the fluid contained in the deformable chambers 20.

A gauge 30 is disposed in a mounting bracket 32 on one end of the base 12. The gauge 30 communicates with an orifice 34 on the side of the base 12 through a length of tubing 36. The orifice 34 communicates with the channel 14 through a temperature variable chamber 38. The temperature variable chamber 38 will be described hereinbelow. The gauge 30, the temperature variable chamber 38 and the tube 36 all comprise part of the sealed volume formed with the deformable volumes 20 and the channel 14.

Each of the deformable volumes 20 is filled with a fluid which, in the preferred embodiment, is a relatively incompressible fluid such as hydraulic fluid. However, it should be understood that any suitable fluid can be utilized. The load bearing layer 28 functions as the primary load bearing surface upon which the weight is essentially disposed resulting in a vertical force thereon. The weight on the load bearing layer 28 is transferred to the exterior surface of the corrugations 18 at the apex thereof. The corrugations 18 have an arcuate cross section that comprises only a portion of the arc of a circle. Although exaggerated for illustrative purposes only, the arc that the corrugations 18 traverse is approximately 70 degrees. Since the load bearing layer 28 only rests upon the apex of the corrugations 18, the load applied to the load bearing layer 28 is thereby concentrated at these apexes along the longitudinal axes of the corrugations 18. Since, as described above, the corrugations 18 are fabricated from a deformable elastic material, a force directed perpendicular to the plane of the base 12 results in deformation thereof causing a corresponding of the deformation of the deformable volumes 20 and a corresponding displacement of the fuild therein. However, it should be understood that a force applied to layer 28 will deform the corrugations 18.

The layer 16 can be fabricated from many materials such as aluminum, copper or any elastic material. As long as the force directed onto the layer 16 does not exceed the range of elasticity of that material, the material will return to its normal position, such as that illustrated in FIG. 2. The thickness of the layer 16 for a particular material is determined by the number of corrugations 18 and the amount of weight to be distributed therebetween. To reduce the maximum amount of deformation that will occur at the apex of each of the corrugations, additional corrugations can be added to further distribute the weight applied to the load bearing layer 28.

Deformation of the corrugations 18 at the apex thereof results in a decreased volume of fluid disposed in the deformable volumes 20. Since the fluid disposed therein is incompressible, it is necessary to provide an expanding reservoir to which the fluid escapes. This expanding reservoir is inherent in the gauge 30 which is a diaphragm pressure gauge that, in the preferred embodiment, is of the type Model Number 612.20 manufactured by Wika Instruments. This is essentially an expanding bellows-type diaphragm which expands under slight pressure increases. This is also a low pressure gauge which results in a very small back pressure on the fluid. This back pressure is negligible in respect to the amount of force applied to each of the corrugations 18. Therefore, the fluid in the overall sealed volume is essentially at a constant pressure and the gauge 30 provides a measurement of volumetric displacement between the deformable volumes 20 and the expanding bellows in the gauge 30. It is important to note that the use of a fluid at a relatively constant pressure aids the assembly of the scale 10 in that the difference between the pressure internal to the deformable volumes 20 and that exterior thereof is essentially equal with very minor variations therebetween. Therefore, the bonding agents attaching the layer 16 to the surface of the base 12 and generally around the perimeter of each of the corru 18 does not have to be a high pressure adhesive, but merely has to provide a low pressure seal.

The layer 28 should also be fabricated of a deformable material, such as that utilized for the layer 16. In order to distribute the weight to a sufficient number of the corrugations 18, the relative height of each of the corrugations 18 with respect to the planar surface of the base 12 should not prevent contact between the apexes of the corrugations 18 and the adjacent surface of the load bearing layer 28. By utilizing a deformable material, a slight height variation can be compensated for between two adjacent corrugations 18. This is due to the fact that a slightly higher resistance will be encountered upon deformation of the corrugations 18 with the increased height, thereby allowing the portion of the layer 28 proximate the apex of a corrugations 18 with a relatively lower height to deform until it contacts the lower height corrugations 18. In this manner, the weight is more evenly distributed to a plurality of adjacent corrugations 18 rather than being concentrated on only a few of the corrugations 18. It should be understood that the weight applied to the layer 28 is not necessarily distributed evenly across all of the corrugations 18 but, rather, may be distributed to only a select few. For example, if the weight were applied to only one corner of the load bearing layer 28, it would only be necessary to concentrate the weight in the immediate vicinity of the weight. This is due to the fact that deformation of the corrugations 18 is designed to remain in a relatively linear elastic range for a given weight. If slightly more weight is concentrated in one area than another, the corrugations 18 are designed to accommodate this increased weight without substantially reducing the accuracy of the gauge 30.

As can be seen from the exploded view in FIG. 3, the layer 16 with the corrugations 18 disposed therein is of singular construction, that is, the corrugations are all stamped in the same piece of material. This unitary construction method results in a very repeatable distribution of corrugations since all of the corrugations are stamped at one time rather than assembled individually. Once the corrugations are dimensioned, the only other variable in the assembly of the scale 10 is the surface of the base 12, the dimensions of which are easily controlled.

In the preferred embodiment, the base 12 is dimensioned to be approximately one-half of an inch in thickness. The layer 16 is fabricated from aluminum having a thickness of approximately 1/16th of an inch. The corrugations have a height above the planar surface of the base of approximately 0.15 to 0.2 inch with approximately 70° of arc. The layer 28 is also fabricated of aluminum and is dimensioned to have a thickness of approximately ⅛th of an inch. The overall dimensions for the scale 10 are approximately one inch in thickness. Since the metal utilizes aluminum, this results in a fairly lighweight and portable scale.

Referring now to FIG. 4, there is illustrated a cross-sectional detailed view of the temperature variable chamber 38. The temperature variable chamber 38 is comprised of a milled rectangular channel 44 disposed in the base 12 and integral therewith. The channel 44 is covered by a layer of bi-metallic material 46. The bi-metallic material is comprised of two different layers of temperature expansive material that have different temperature coefficients. The result is that the layer 46 of bi-metallic material will become concave for a temperature variation in one direction and convex for a temperature variation in the opposite direction. The result is that the volume in the chamber defined by the channel 44 and the layer 46 of by-metallic material varies as a function of temperature. For a fluid which expands as temperature increases, the bi-metallic layer forming the layer 46 of bi-metallic material will be chosen such that the layer 46 of bi-metallic material becomes convex as temperature increases thereby increasing the volume and maintaining a constant pressure within the overall sealed volume. Since the gauge 30 is operable to measure an increase of volume over that present in the sealed volume defined by the deformable volumes 20, the channel 14, and the bellows gauge 30, the temperature variable chamber 38 essentially varies the overall sealed volume to compensate for increases in the volume of the fluid such that the bellows in the gauge 30 In addition, there are some volumetric variations resulting from expansion and contraction of the base 12. These also can be compensated by the temperature variable chamber 38.

Referring now to FIG. 5, there is illustrated a cross-sectional view of a weighing scale 47 which is another embodiment of the scale 10 of FIG. 1 wherein like numerals refer to like parts in the various figures. In the scale 47, a channel 48 is milled on the side of the base 12 opposite the channel 14. A cover 50 is disposed over the channel 48 to define a chamber 52 therein. The volume of the compensating chamber 52 is essentially equal to the total volume of all of the deformable volumes 20 and the channel 14. The compensating chamber 52 is filled with a liquid identical to the liquid in the deformable volumes 20. Therefore, an increase or decrease in volume resulting from temperature variations results in an equal increase or decrease in volume in the compensating chamber 52.

A conduit 54 is disposed in the base 12 connecting an orifice 56 disposed on the outside of the base 12 to the channel 14 to provide fluid communication therebetween. A conduit 58 is disposed in the base 12 connecting an orifice 60 to the compensating chamber 52 to provide fluid communication therebetween. A differential gauge 62 has one of its differential inputs connected to the orifice 56 through a connecting conduit 64 and the other differential input thereof connected to the orifice 60 through a connecting conduit 66. The differential gauge 62 is operable to read the difference in volumetric displacement between the liquid contained in the compensating chamber 52 and the liquid contained in the deformable volumes 20. The differential gauge has expanding bellows interior thereto to provide an expanding reservoir for the volumetric displacement. As described above, a volumetric expansion or contraction of the liquid disposed in the deformable volumes 20 will be compensated by an equal volumetric expansion or contraction, respectively, of the liquid contained in the compensating chamber 52. When weight is applied to the load bearing layer 28, fluid is expelled from the deformable volumes 20 resulting in an additional volumetric displacement that is not compensated by the compensating chamber 52. This difference in volumetric displacement between the two chambers is registered on the differential gauge 62, as will be described hereinbelow.

Referring now to FIG. 6, there is illustrated one embodiment of the differential gauge 62 of FIG. 5. The connecting conduit 64 is input to the differential gauge 62 to connect with a connecting conduit 68. The other end of the connecting conduit 68 is connected to a tee 70. The other end of the tee 70 is connected to one end of a connecting conduit 72. The other end of the connecting conduit 72 is connected to an expandable diaphragm or bellows 74. The tee 70 is also connected through a conduit 76 to a transducer 78. The connecting conduit 66 that communicates with the compensating chamber 52 is input to the differential gauge 62 through a connecting conduit 80. The connecting conduit 80 has the other end thereof connected to a tee 82. The other end of the tee 82 is connected to one end of a connecting conduit 84. The other end of the connecting conduit 84 is connected to an expanding diaphragm or bellows 86.

The expanding diaphragms or bellows 74 and 86 are essentially identical to the gauge 30 of FIG. 1. The internal mechanism of the gauge 30 is essentially an expandable diaphragm or bellows. These bellows expand upon pressure exerted upon the fluid. Since this gauge 30 is a low pressure gauge, a pressure increase is required to expand the internal bellows in the gauge 30. Although the differential gauge 62 is illustrated using expanding bellows, it should be understood that other assemblies may be used. For example, inverted U-tubes can be utilized wherein the increasing head pressure resulting from volumetric expansion creates a slight negative back pressure.

The difference in the slight negative back pressure resulting from the expansion of the bellows 74 and 86 is measured by the transducer 78. The transducer 78 is of a differential type manufactured by Ametek Controls Division Model No. 55AD001A. As long as the volumetric displacement is equal in both connecting conduits 64 and 66, the differential pressure registered on transducer 78 will be zero. However, when the pressure in connecting conduit 68 increases over that in connecting conduit 66, the transducer 78 will register a differential pressure therebetween. This differential pressure is proportional to the weight applied to the load bearing layer 28. However, it should be emphasized that the variations in pressure within both the deformable volumes 20 and the compensating chamber 52 results in only negligable variations in the deformation of the corrugations 18.

In summary, there has been provided a weight scale that utilizes a layer of elastically deformable material with a plurality of longitudinal corrugations disposed therein. This layer of deformable material is mounted on a base with a load bearing layer disposed on the top of the corrugations. A deformable volume is defined within each of the corrugations between the interior walls thereof and the upper surface of the base. A connecting channel connects these deformable volumes together to form a common reservoir. This common reservoir is attached to an expanding bellows-type gauge for measuring volumetric displacement of the fluid that is disposed in the deformable chambers. Weight applied to the load bearing layer results in deformation of the corrugations to cause a volumetric displacement of the fluid from the deformable chambers into the expanding bellows. Measurement of this volumetric displacement is converted to a weight measurement.

Although the preferred embodiment has been described in detail, it should be understood that various changes, substitutions and alterations can be made therein without departing from the spirit and scope of the invention as defined by the appended claims.

What is claimed is:

1. An apparatus for measuring weight, comprising:
a base having a planar upper surface;
a layer of elastically deformable material disposed on the planar surface of said base, said deformable layer having a plurality of concavities formed therein protruding outward from said base, the inner surface of said concavities and the planar surface of said base forming a plurality of deformable chambers;
channel means for communicating with said deformable chambers to form a common reservoir;
said deformable chambers and said channel means filled with a fluid;
a load bearing layer disposed on the outer surface of said concavities for receiving the weight to be measured, said load bearing layer deforming said deformable chambers such that the volume of said deformable chambers is altered; and
means for measuring a physical characteristic of said fluid in said deformable chambers as a function of the deformation of said deformable chambers resulting from the weight applied to said load bearing layer and converting the measured physical characteristic of said fluid to a weight measurement.

2. The apparatus of claim 1 wherein said fluid is essentially incompressible and wherein said physical characteristic comprises the volumetric displacement of said fluid.

3. The apparatus of claim 1 wherein said concavities have a longitudinal shape and are oriented parallel to adjacent ones of said concavities, all of said concavities having essentially equal dimensions with essentially equal heights above the planar surface of said deformable layer.

4. The apparatus of claim 3 wherein said concavities have an arcuate cross-sectional shape.

5. The apparatus of claim 3 wherein said concavities are spaced equi-distant apart on said deformable layer.

6. The apparatus of claim 3 wherein said channel means comprises a channel disposed in said base on the planar surface thereof and oriented essentially at right angles to said deformable chambers and in fluid communication therewith.

7. The apparatus of claim 1 wherein said load bearing layer is comprised of a deformable material.

8. The apparatus of claim 1 further comprising compensating means for compensating volumetric changes of said liquid contained in said deformable chambers as a function of temperature.

9. The apparatus of claim 8 wherein said compensating means comprises a sealed chamber in communication with said channels, said sealed chamber having a temperature dependent volume that expands for a temperature variation in a first direction to prevent a temperature related expansion of said fluid from causing a volumetric displacement into said expansion means and said sealed chamber contracting in the opposite temperature direction to prevent a corresponding temperature related contraction of said fluid from causing a volumetric displacement in said expansion means.

10. An apparatus for measuring weight, comprising:
a rectangular base having a planar surface;
a plurality of elastically deformable concave members disposed on the planar surface of said base and protruding outward therefrom, said concave members having essentially equal dimensions, the inner surface of said concave members and the planar surface of said base forming a plurality of deformable chambers;
channel means for communicating with the plurality of said deformable chambers to form a common reservoir;
said deformable chambers and said channel means filled with a fluid;

expansion means connected to said channel means for allowing volumetric displacement of said fluid in said deformable chambers upon deformation of said deformable chambers;

a layer of deformable material disposed over said concave members to receive the weight to be measured and distribute the weight to said concave members for deformation thereof, deformation of said concave members resulting in a volumetric displacement of said fluid between said deformable chambers and said expansion means; and means for measuring the volumetric displacement of said fluid between said deformable chambers and said expansion means as a function of the deformation of said deformable chambers resulting from weight applied to said deformable layer.

11. The apparatus of claim 10 wherein each of said concave members comprises a longitudinal member with a concave inner surface and an arcuate cross section.

12. The apparatus of claim 11 wherein said concave members are formed in a layer of elastically deformable material such that all of said concave members are equally spaced apart.

13. The apparatus of claim 12 wherein said channel means comprises a rectangular channel disposed in the planar surface of said base.

14. The apparatus of claim 10 wherein said concave members are fabricated from aluminum.

15. The apparatus of claim 10 wherein said fluid is essentially incompressible.

16. The apparatus of claim 10 wherein said expansion means comprises an expandable bellows.

17. The apparatus of claim 10 further comprising means for compensating temperature related volumetric changes in said fluid.

18. The apparatus of claim 17 wherein said compensating means comprises a temperature variable sealed volume connected between said expansion means and said deformable chambers for expanding and contracting with a corresponding expansion and contraction of said fluid to prevent said expansion means from expanding or contracting as a function of temperature.

19. The apparatus of claim 17 wherein said compensating means comprises:

a compensating sealed chamber having an essentially nondeformable boundary surface;

said compensating chamber having a volume essentially equal to the total volume of said deformable chambers formed by said concave members in the nondeformed state;

said compensating chamber having said fluid disposed therein;

second expansion means in fluid communication with said compensating chamber to allow for expansion and contraction thereof; and said means for measuring comprising a differential gauge for measuring the differential volumetric change of the fluid between said deformable chambers and said expansion means with respect to the volume of fluid in said compensating chamber and said second expansion means wherein a volumetric change in said fluid in said deformable chambers and said expansion means results in an essentially equal volumetric change in said compensating chamber and said second expansion means such that a temperature related expansion or contraction of the liquid in said deformable chambers is compensated by an essentially equal temperature related contraction or expansion, respectively, of the fluid in said compensating chamber wherein only the differential volumetric change is indicative of weight measurement.

20. An apparatus for measuring weight, comprising:

a rectangular base having a planar upper surface;

a layer of elastically deformable material having a plurality of longitudinal concave indentations formed therein, said deformable layer disposed on the upper surface of said base with said indentations oriented to protrude outward from said base, said concave indentations and the upper surface of said base forming a plurality of essentially equal volume deformable chambers;

a channel disposed in the planar upper surface of said base under said deformable layer and in communication with the interior of all of said deformable chambers formed by said concave indentations;

said deformable chambers and said channel filled with an incompressible fluid;

an expandable bellows in fluid communication with said channel for allowing volumetric displacement of said fluid in said deformable chambers;

a load bearing layer disposed on said concave indentations exterior to said deformable chambers for receiving the weight to be measured, said load bearing layer deformable to equally distribute the weight to a plurality of said deformable chambers to deform said deformable chambers such that the volume of said deformable chambers is altered resulting in a volumetric displacement between said deformable chambers and said bellows;

a gauge for measuring weight as a function of volumetric displacement from said deformable chambers to said bellows; and compensating means for compensating temperature related volumetric expansion and contraction of said fluid.

21. The apparatus of claim 20 wherein said compensating means comprises a temperature variable sealed volume connected between said bellows and said deformable chambers to provide a compensating volumetric expansion for a corresponding volumetric expansion of said fluid with respect to temperature and to provide a compensating volumetric contraction for a corresponding volumetric contraction of said fluid with respect to temperature such that essentially zero displacement is achieved between said deformable chambers and said bellows over temperature.

* * * * *